(12) United States Patent
Settineri

(10) Patent No.: US 7,137,362 B1
(45) Date of Patent: Nov. 21, 2006

(54) BI-ASSEMBLY SPRING END CAP FOR VEHICLE ON/OFF FAN DRIVE TO IMPROVE SEAL LIFE, REDUCE VIBRATION INPUT LOADING TO BALL BEARINGS AND REDUCE COMPONENT COST

(75) Inventor: Samuel Edgar Settineri, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/202,561

(22) Filed: Aug. 12, 2005

(51) Int. Cl.
*F01P 7/02* (2006.01)

(52) U.S. Cl. ............... 123/41.12; 123/41.11; 192/85 R

(58) Field of Classification Search ......... 123/41.11, 123/41.12; 236/35; 416/32; 192/82 R, 192/85 A, 85 R
See application file for complete search history.

(56) References Cited

U.S. PATENT DOCUMENTS

| | | | |
|---|---|---|---|
| 1,291,875 A | 1/1919 | Herr | |
| 3,497,046 A | 2/1970 | Schilling | |
| 3,757,914 A | 9/1973 | Elmer | |
| 3,777,866 A | 12/1973 | Elmer | |
| 3,804,219 A | 4/1974 | Cummings, III | |
| 3,848,622 A | 11/1974 | Cummings, III | |
| 4,290,393 A | 9/1981 | Hart et al. | |
| 6,595,341 B1 | 7/2003 | Venz | |

*Primary Examiner*—Noah P. Kamen
(74) *Attorney, Agent, or Firm*—Greg Dziegielewski, Esq.; Artz & Artz, P.C.

(57) ABSTRACT

An on/off clutch assembly is disclosed having a two-component spring end cap. The spring end cap includes a steel cap portion and a non-metallic portion. The non-metallic portion extends along the entire length of the steel cap portion and is located between the steel cap portion and the piston rod. The new design insulates the steel piston rod from the steel spring end cap. This results in reduced corrosion of seals within the clutch assembly and contributes to improved conditions for bearings within the clutch assembly.

28 Claims, 3 Drawing Sheets

BI-ASSEMBLY SPRING END CAP FOR VEHICLE ON/OFF FAN DRIVE TO IMPROVE SEAL LIFE, REDUCE VIBRATION INPUT LOADING TO BALL BEARINGS AND REDUCE COMPONENT COST

TECHNICAL FIELD

The present invention relates generally to a cone clutch fan drive and more particularly to a pneumatic cone clutch fan drive having a two-component spring end cap including a steel cap portion and a non-metallic portion.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to run continuously. At times, it is desirable for the temperature within the coolant to increase rather than decrease. Additionally, continuous operation when unnecessary places a non-required draw on the engine and thereby reduces efficiency. To compensate for this, present fan assemblies utilize fan clutch assemblies that allow for the selective engagement of the fan to the engine such that the fans are engaged only when necessary.

The present invention relates to friction coupling devices that drive radiator-cooling fans. A common friction-coupling device is that of the dry friction drive style, otherwise referred to interchangeably hereinafter with a friction clutch assembly. Dry friction drives are used for their simplicity, cool operating temperature, and ability to turn at fully engaged peak operating speeds.

Although the present invention may be used advantageously in various configurations and applications, it is especially advantageous in a coupling device of the type used to drive a radiator cooling fan of an internal combustion engine for an over the road truck, such as a class 8 truck, and will be described in connection therewith.

Dry friction drives tend to have two operating conditions "ON and OFF", which refer to when an associated friction clutch is either fully engaged or fully disengaged. When a friction clutch assembly is fully engaged, the assembly provides cooling to an associated engine and is not slipping. When a friction clutch assembly is fully disengaged slippage between the clutch plate and an engagement surface is at a maximum, thus providing little rotational output to drive an associated fan.

There are several disadvantages of known dry friction drives. One disadvantage is damage done to O-rings or seals within the friction clutch assembly. It has been determined that one source of damage done to the O-rings is due to contamination introduced into the environment. Another disadvantage is failure of the bearings within the friction clutch assembly. Bearing failure has been linked with excessive vibrations to the assembly.

These problems stem from the interaction between components in known friction clutch assemblies. There is a spring assembly that resides between the rotating drive shaft and the clutch housing. The spring assembly includes a spring and two end caps, each positioned at one end of the spring. The first end cap is translatable along the piston rod in response to a fluidic control circuit demanding disengagement of the clutch assembly. The first end cap is made from steel and the piston rod is made from steel. Therefore, the steel end cap moves back and forth over the steel piston rod. Internal metal-to-metal contact between the piston rod and spring end cap, sets up the perfect environment for fretting corrosion when coupled with engine vibrations, thus producing significant amounts of oxide particles which contaminate and degrade a nearby seal.

Another problematic issue with known dry friction drives is the costly step of machining radii in the inner diameter of the steel spring end cap.

SUMMARY OF THE INVENTION

It is therefore an object of the present invention to provide a clutch assembly in which the steel end cap is insulated from the steel piston rod. The present invention provides for a non-metallic insulation that will prevent corrosion and act to reduce vibrations delivered to the front and rear ball bearings. Further, the non-metallic insulation will be molded, thus allowing for radii to be directly molded into the component.

The proposed invention, consisting of a multi-piece spring end cap eliminates the contamination, providing for a clean and debris free environment for extended seal and bearing life, while at the same time, dampening vibrations within the clutch assembly.

In accordance with the objects of the present invention, the translatable steel end cap is made from two components. There is a steel cap portion and a non-metallic portion. The non-metallic portion extends along the steel cap portion and is located between the steel cap portion and the piston rod.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
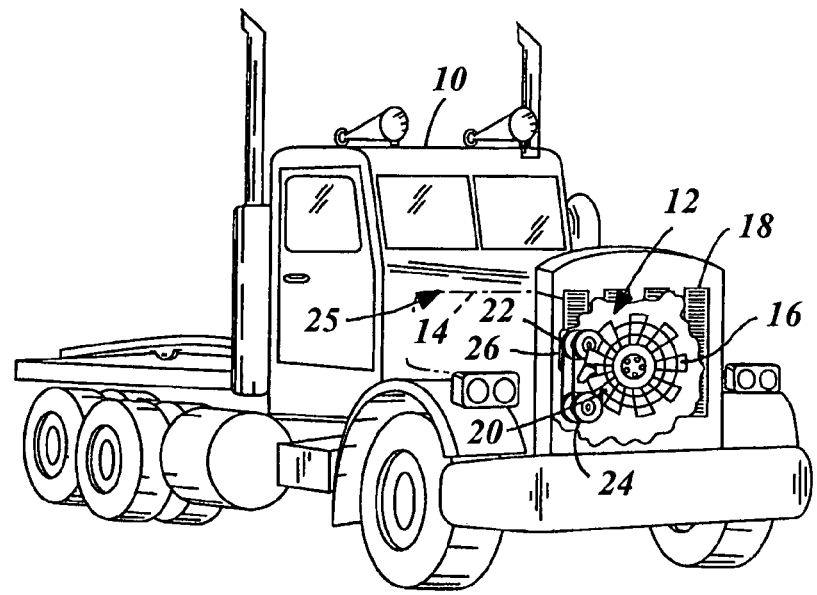
FIG. 1 is a perspective view of a vehicle utilizing a friction clutch assembly in accordance with an embodiment of the present invention.

In the following figures the same reference numerals will be used to refer to the same components. While the present invention is described primarily with respect to a cone clutch fan drive system, the present invention may be adapted and applied to various systems including: hydraulic systems, electrical systems, pneudraulic systems, mechanical systems, pneumatic systems, vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application. Although the following description addresses a specific type of control system that drives a clutch assembly, it should be noted that those of ordinary skill in the art will recognize other types of control systems to which the present invention may be incorporated.

Referring now to FIG. 1, a perspective view of a vehicle 10 utilizing a fluidically controlled fan drive system 12 in accordance with an embodiment of the present invention is shown. The system 12 uses rotational energy from a liquid cooled engine 14 at an increased ratio to turn a radiator-cooling fan 16 to provide airflow through a radiator 18. The system 12 includes a friction clutch assembly 20 that is fixed to one or more pulleys, such as pulley 22, which is coupled to and rotates relative to a crankshaft (not shown) of the engine 14. The pulleys rotate via a pair of belts 24, within an engine compartment 25. Of course, the present invention may be relatively operative in relation to various components and via any number of belts or other coupling devices, such as a timing chain. The friction clutch assembly 20 is mounted on the engine 14 via a mounting bracket 26. The friction clutch assembly 20 pneumatically engages the fan 16 during desired cooling intervals to reduce the temperature of the engine 14.

The fan 16 may be attached to the friction clutch assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2:
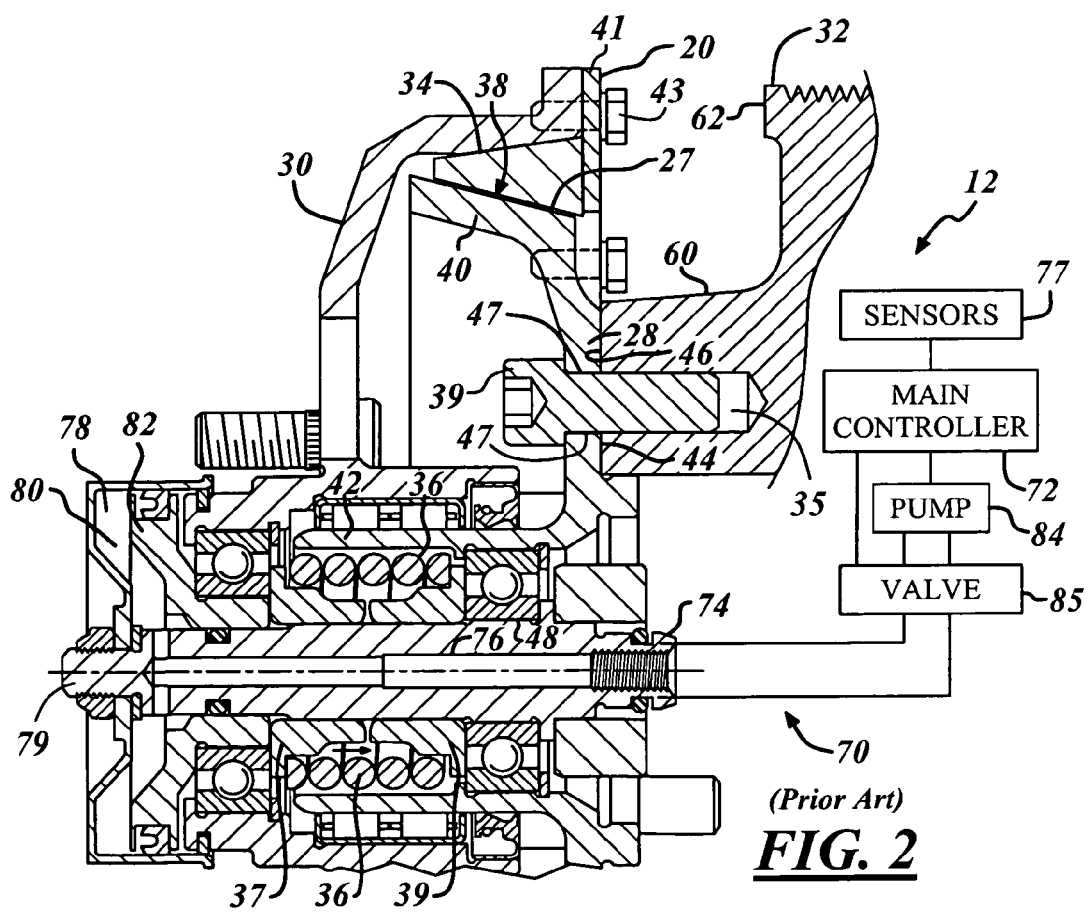
FIG. 2 is a quarter side cross-sectional view of a friction clutch assembly in accordance with an embodiment of the prior art.
Figure 3:
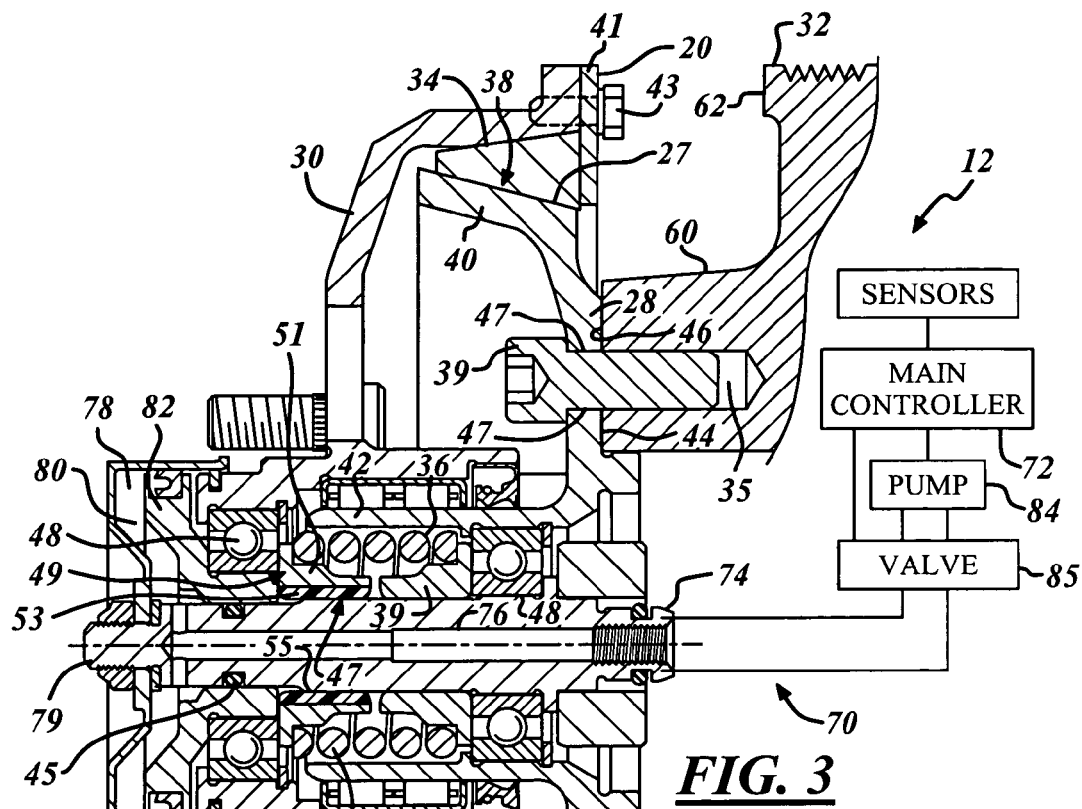
FIG. 3 is an illustration of a cone clutch fan drive in accordance with the present invention in a clutch engaged position.
Figure 4:
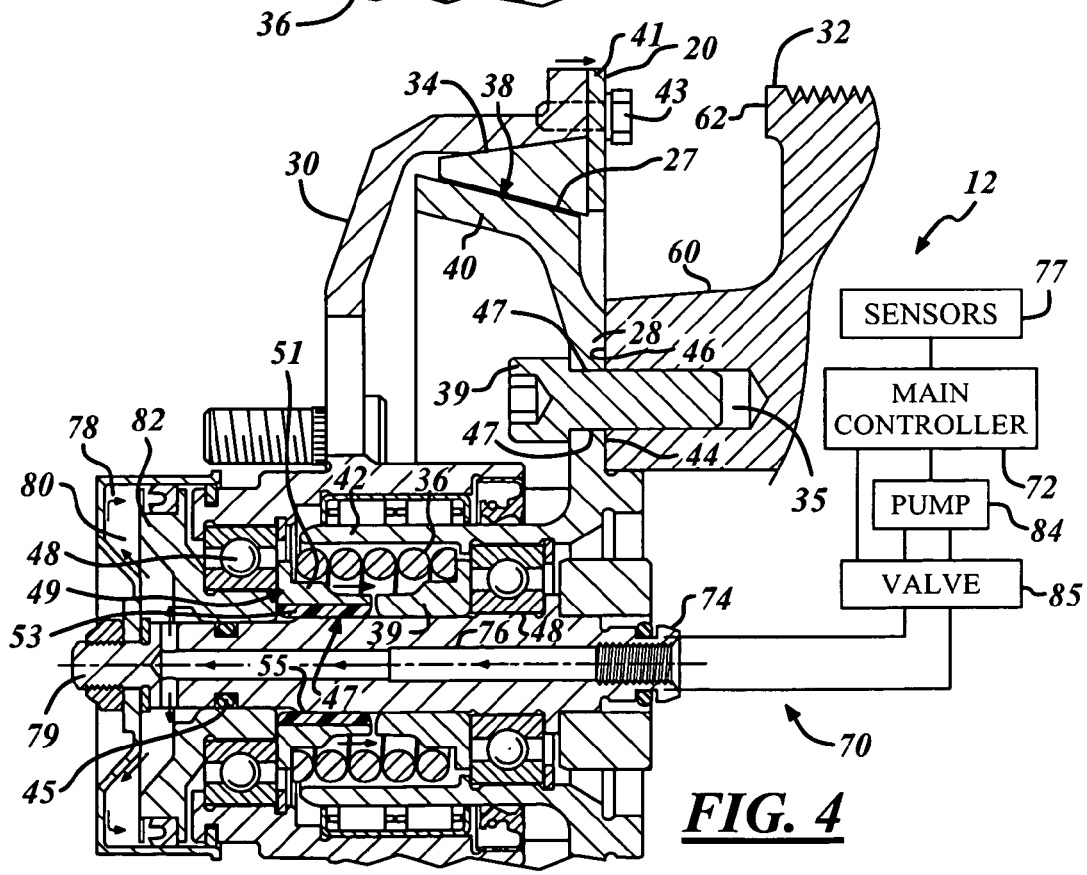
FIG. 4 is an illustration of a cone clutch fan drive in accordance with the present invention in the clutch-disengaged position.

In summary, FIGS. 2–6 illustrate a quarter side cross-sectional view of the friction clutch assembly 20 having a rotating shaft 27 with a thermal energy transfer portion 28 in an engaged position in accordance with an embodiment of the prior art (FIG. 2) and according to a preferred embodiment of the present invention in both the engaged (FIG. 3) and disengaged position (FIG. 4). As will be described further below, a new two-component spring end cap is disclosed in the present invention as presented in FIGS. 3, 4, 5 and 6.

Referring specifically to FIG. 2, a known assembly 20 includes a translatable clutch housing 30 and a drive shaft 27 which is coupled to and rotates with the drive pulley 32. The clutch housing 30 is attached to an engine-cooling fan, such as fan 16. A friction liner, also referred to as a clutch element 34, is coupled to the clutch housing 30 using a series of stamped plates 41 and screws 43 (the cross section shows one plate 41 and a pair of screws 43) and resides between the clutch housing 30 and the rotating drive shaft 27.

A clutch spring 36 engages the clutch housing 30 with the drive shaft 27 in a friction clutch engagement area 38. In operation, the drive pulley 32 rotates in turn rotating the drive shaft 27, which when engaged rotates the translatable clutch housing 30. The rotation of the housing 30 is translated to the radiator-cooling fan 16 to provide airflow through a radiator 18.

The drive shaft 27 has the transfer portion 28, as well as a friction contact portion 40 and a spring/bearing portion 42. The transfer portion 28 is generally vertical in orientation, whereas the friction contact portion 40 and the spring/bearing portion 42 are generally horizontal in orientation. A bearing 48 couples the spring/bearing portion 42 to a non-rotating shaft 79. The transfer portion 28 has a pulley contact surface 44 that corresponds with a shaft contact surface 46 on the drive pulley 32.

The clutch spring 36 is held in position by a first spring end cap 37 and a second spring end cap 39, one situated at each end of the spring 36. The first and second spring end caps 37, 39 are positioned around the piston rod 74 and all three components are made from steel. Further, the first spring end cap 37 moves back and forth along the piston rod 74 in response to motion of the piston head 82. The second spring end cap 39 preferably does not move along the piston rod 74.

Known clutch assemblies are problematic due to the motion of the metal first spring end cap 37 moving over the metal piston rod 74. This contact between the piston rod 74 and the end cap 37 provides the ideal environment for fretting corrosion when coupled with engine vibrations, thus producing significant amounts of oxide particles that contaminate and degrade a nearby seal 45 and contribute to shortened lives of bearings 48 within the clutch system.

Figure 5:
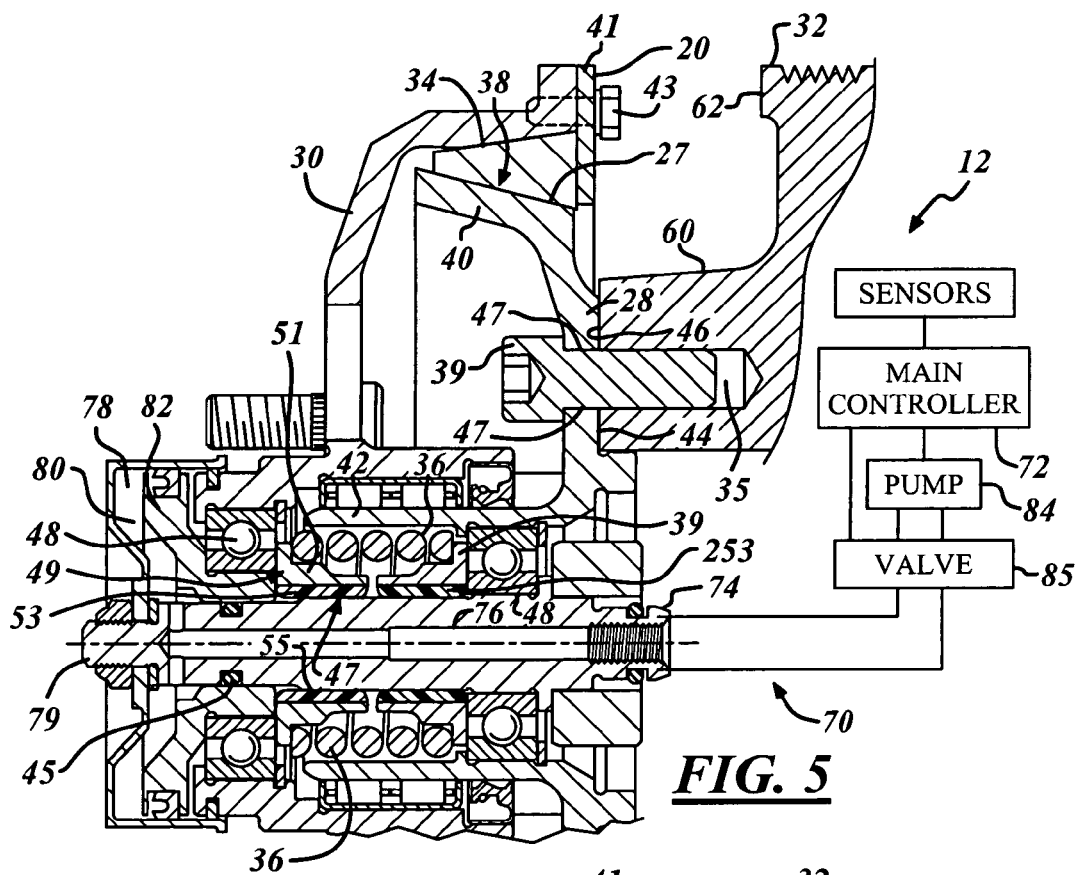
FIG. 5 is an illustration of an alternative embodiment of the fan drive in accordance with the present invention.
Figure 6:
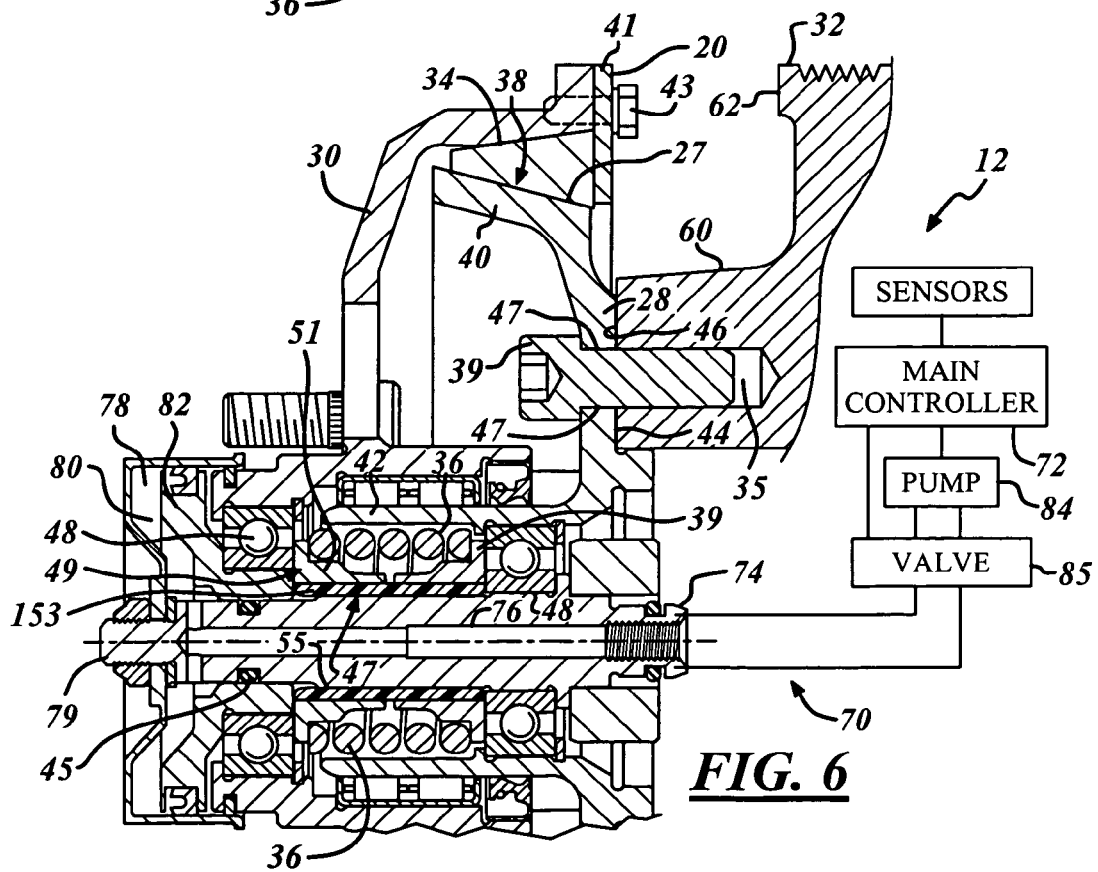
FIG. 6 is an illustration of another alternative embodiment of the fan drive in accordance with the present invention.

The proposed invention, as illustrated in FIGS. 3–5, is a clutch spring mechanism, shown generally at 47, including a multiple piece spring end cap 49 that eliminates the contamination, provides for a clean and debris free environment for extended seal and bearing lives, while at the same time, dampening vibrations within the clutch assembly. The present invention provides for a two-component spring end cap 49 having a steel cap portion 51 and a non-metallic portion 53. The non-metallic portion 53 is located between the steel cap portion 51 and the piston rod 74.

Further, the non-metallic portion 53 is molded. It could be molded from many different types of materials including, but not limited to, nylon. An advantage of molding the non-metallic portion is that the required inner diameter 55 can be molded directly into the part, as opposed to machining it into the completely steel component.

There are a number of different configurations for the non-metallic component 53. In one embodiment, the non-metallic portion 53 is attached to the steel cap portion 51. In a second embodiment, the non-metallic portion 53 is attached to the exterior surface of the piston rod 74. In a third embodiment, illustrated in FIG. 5, there is a non-metallic portion 53 positioned between the steel end cap portion 51 and the piston rod 74 and a second non-metallic portion 253 positioned between the second spring end cap 39 and the piston rod 74. In a fourth embodiment, illustrated in FIG. 6, the non-metallic portion 153 is positioned along the piston rod 74 between the steel cap portion 51 and the second spring end cap 39 and extends the length of the steel cap portion 51 and the second spring end cap 39.

The drive pulley 32 includes a center protruding portion 60 and a pulley portion 62. The center portion 60 extends forward away from the pulley portion 62 and is in contact with the shaft 27. The center portion 60 includes the shaft contact surface 46 and is coupled to the drive shaft 27.

The friction clutch assembly 20 also includes a fluidic control circuit 70 that is operated via a main controller 72. The fluidic control circuit 70 includes a piston rod or pneumatic transfer conduit 74 with a fluid channel 76 residing therein for the transfer of fluid, such as air, into a piston reservoir 78 of a fluid cylinder 80. The fluid cylinder 80 resides over a piston head 82. The piston reservoir is also referred to as a pressure chamber 78 that is defined by the clutch housing and piston head. A fluid pump 84 and a corresponding valve 85 are fluidically coupled to the fluid channel 76. The main controller 72 is coupled to the pump 84 and to the valve 85 and adjusts the flow of the fluid into and out of the pressure chamber 78. The valve 85 may, for example, be in the form of a solenoid.

The main controller 72 may be contained within the system 12 or may be separate from the system 12 as shown. The main controller 72 may be microprocessor based such as a computer having a central processing unit, memory (RAM and/or ROM), and associated input and output buses. The main controller 72 may be a portion of a central vehicle main control unit, an interactive vehicle dynamics module, a cooling system controller, or may be a stand-alone controller as shown. The main controller 72 may be coupled to a plurality of sensors 77 located throughout the engine that give inputs regarding particular engine operating conditions. The main controller 72 interprets these signals to adjust the flow of fluid into and out of the fluid reservoir 78, therein precisely controlling the engagement or disengagement of the friction clutch assembly and therein precisely controlling the engine operating temperature to achieve a desired balance of engine performance characteristics such as fuel economy and emission.

The friction clutch assembly 20 is frequently engaged, as shown in FIGS. 2 and 3. When engaged no fluid is pumped into the chamber or reservoir 78. The piston head 82 and thus the housing 30 are in a fully engaged position. In the engaged position the spring 36 is decompressed or in an expanded state.

When cooling is no longer desired the main controller 72 pumps fluid into the reservoir 78, which causes the piston head 82 to shift rearward (rightward in FIG. 4), towards the shaft 27. As the piston head 82 shifts rearward, the housing 30 also shifts rearward, thereby, compressing the spring 36 and causing the clutch element 34 and thus the housing 30 to disengage with the drive shaft 27. This is the so-called disengaged position as shown in FIG. 4.

Of course, in other preferred embodiments, the engagement and disengagement mechanism of a preferred embodiment of the present invention may be reversed, wherein the clutch mechanism is maintained in a disengaged state in the absence of activation from the main controller and still fall within the spirit of the present invention.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An on/off fan drive system of an engine comprising:
   a clutch housing;
   a pressure chamber defined by said clutch housing;
   a piston rod including a central piston channel feeding said pressure chamber;
   a translatable clutch piston head positioned about said piston rod and within said clutch housing, said translatable clutch piston head is in communication with said pressure chamber and is movable between a piston neutral position and a piston activated position;
   a rotating drive shaft positioned within said clutch housing;
   a clutch element in communication with said translatable clutch piston head such that said clutch element is moved from a clutch engaged position to a clutch disengaged position in response to said translatable clutch piston head moving from said piston neutral position to said piston activated position, said clutch element engaging said rotating drive shaft when in said clutch engaged position; and
   a clutch spring mechanism positioned between said rotating drive shaft and said clutch element, said clutch spring mechanism biasing said clutch element into said clutch engaged position with a clutch engagement force, said clutch spring mechanism having a two-component spring end cap including a steel cap portion and a non-metallic portion, said non-metallic portion located between said steel cap portion and said piston rod.

2. The on/off fan drive system of claim 1 further comprising a fan coupled to said clutch housing.

3. The on/off fan drive system of claim 2 wherein said clutch element is a cone clutch element.

4. The on/off fan drive system of claim 2 wherein said non-metallic portion of said two-component spring end cap is molded from a polymer material.

5. The on/off fan drive system of claim 4 wherein said non-metallic portion of said two-component spring end cap is molded from nylon.

6. The on/off fan drive system of claim 5 wherein said non-metallic portion is molded including radii on an inner diameter of the part.

7. The on/off fan drive system of claim 6 wherein said steel cap portion and said non-metallic portion are attached together.

8. The on/off fan drive system of claim 6 wherein said non-metallic portion is attached to an exterior surface of said piston rod.

9. The on/off fan drive system of claim 6 wherein said clutch spring further includes a second spring end cap and said non-metallic potion extends the length of said steel cap portion and a length of said second spring end cap.

10. The on/off fan drive system of claim 6 further comprising:
    a fluid pump having a valve coupled to said central piston channel, said fluid pump introducing a quantity of fluid from said valve through said central piston channel to said pressure chamber, wherein said quantity of fluid acts to push said piston head against said clutch spring mechanism, therein moving said translatable clutch element from said engaged position to said disengaged position; and
    a main controller that communicates with said fluid pump to control said quantity of fluid within said pressure chamber.

11. The on/off fan drive system of claim 10 further comprising one or more sensors electrically coupled to said main controller, said one or more sensors sending an electronic signal to said main controller as a function of an engine operating condition.

12. An on/off fan drive system of an engine comprising:
    a clutch housing;
    a pressure chamber defined by said clutch housing;
    a piston rod including a central piston channel feeding said pressure chamber;

a translatable clutch piston head positioned about said piston rod and within said clutch housing, said translatable clutch piston head is in communication with said pressure chamber and is movable between a piston neutral position and a piston activated position;

a rotating drive shaft positioned within said clutch housing;

a clutch element in communication with said translatable clutch piston head such that said clutch element is moved from a clutch disengaged position to a clutch engaged position in response to said translatable clutch piston head moving from said piston neutral position to said piston activated position, said clutch element engaging said rotating drive shaft when in said clutch disengaged position; and a clutch spring mechanism positioned between said rotating drive shaft and said clutch element, said clutch spring mechanism biasing said clutch element into said clutch disengaged position with a clutch engagement force, said clutch spring mechanism having a two-component spring end cap including a steel cap portion and a non-metallic portion, said non-metallic portion extending along an entire length of said steel cap portion located between said steel cap portion and said piston rod.

13. The on/off fan drive system of claim 12 further comprising a fan coupled to said clutch housing.

14. The on/off fan drive system of claim 13 wherein said clutch element is a cone clutch element.

15. The on/off fan drive system of claim 13 wherein said non-metallic portion of said two-component spring end cap is molded.

16. The on/off fan drive system of claim 15 wherein said non-metallic portion of said two-component spring end cap is molded from nylon.

17. The on/off fan drive system of claim 16 wherein said non-metallic portion is molded including radii on the inner diameter of the part.

18. The on/off fan drive system of claim 17 wherein said steel cap portion and said non-metallic potion are attached together.

19. The on/of fan drive system of claim 17 wherein said non-metallic portion is attached to an exterior surface of said piston rod.

20. The on/off fan drive system of claim 17 wherein said clutch spring further includes a second spring end cap and said non-metallic portion extends the length of said steel cap portion and a length of said second spring end cap.

21. The on/off fan drive of claim 17 further comprising:

a fluid pump having a valve coupled to said central piston channel, said fluid pump introducing a quantity of fluid from said valve through said central piston channel to said pressure chamber, wherein said quantity of fluid acts to push said piston head against said clutch spring mechanism, therein moving said translatable clutch element from said disengaged position to said engaged position; and a main controller that communicates with said fluid pump to control said quantity of fluid within said pressure chamber.

22. The on/off fan drive system of claim 21 further comprising one or more sensors electrically coupled to said main controller, said one or more sensors sending an electronic signal to said main controller as a function of an engine operating condition.

23. An engine cooling system comprising:
(a) an engine having a crankshaft, said crankshaft rotating at a given engine speed;
(b) a radiator coupled to said engine;
(c) a drive pulley coupled to and rotating with said crankshaft;
(d) a friction coupling assembly mounted to said engine and coupled with said drive pulley, said friction clutch assembly including:
a translatable clutch housing;
a drive shaft coupled to said drive pulley;
a friction liner residing between and engageable with said rotating shaft and said translatable clutch housing, said engagement thereof causing said translatable clutch housing to rotate when said friction liner is engaged with said drive shaft at said given engine speed; and
a clutch spring mechanism positioned between said drive shaft and said friction liner, said clutch spring mechanism biasing said friction liner into said engaged position with a clutch engagement force, said clutch spring mechanism having a two-component spring end cap including a steel cap portion and a non-metallic portion, said non-metallic portion extending along an entire length of said steel cap portion; and
(e) a fan coupled to said friction coupling assembly and capable of rotating with said translatable clutch housing to provide cooling airflow to said radiator.

24. The engine cooling system of claim 23 wherein said friction coupling assembly further includes:

a fluidic control circuit coupled to said translatable clutch housing and capable of moving said translatable clutch housing between an engaged position and a disengaged position, said engaged position defined wherein said friction liner is fully engaged with said drive shaft to rotate said translatable clutch housing as a function of a rotational rate of said drive shaft and wherein said disengaged position is defined wherein said friction liner is disengaged from said drive shaft; and a main controller for controlling the relative location of said translatable clutch housing between said engaged position and said disengaged position.

25. The engine cooling system of claim 24 wherein said fluidic control circuit includes:

a pneumatic transfer circuit coupled within said rotating shaft, said pneumatic transfer circuit including a piston rod, a fluid channel in the center of said piston rod, and a piston head, said piston rod being coupled with said translatable clutch housing;

a fluid cylinder coupled to said pneumatic transfer circuit;

a piston reservoir fluidically coupled to said fluid channel, said piston reservoir defined between said fluid cylinder and said piston head;

a clutch spring positioned between said piston rod and said drive shaft, said clutch spring biasing said piston head and said translatable clutch housing into said engaged position with a clutch engagement force;

a fluid pump having a valve coupled to said fluid channel, said fluid pump introducing a quantity of fluid from said fluid pump through said fluid channel to said piston reservoir, wherein said quantity of fluid acts to push said piston head against said clutch spring, herein moving said translatable clutch housing from said engaged position to said disengaged position;

wherein said main controller controls said quantity of fluid within said reservoir.

26. The engine cooling system of claim 25, wherein said friction coupling assembly further includes one or more sensors electrically coupled to said main controller, said one or more sensors sending an electrical signal to said main controller as a function of an engine operating condition.

27. The engine cooling system of claim 24 wherein said fluidic control circuit includes:
- a pneumatic transfer circuit coupled within said rotating drive shaft, said pneumatic transfer circuit including a piston rod, a fluid channel in the center of said piston rod, and a piston head, said piston rod being coupled with said translatable clutch housing;
- a fluid cylinder coupled to said pneumatic transfer circuit;
- a piston reservoir fluidically coupled to said fluid channel, said piston reservoir defined between said fluid cylinder and said piston head;
- a clutch spring positioned between said piston rod and said drive shaft, said clutch spring biasing said piston head and said translatable clutch housing into said disengaged position with a clutch engagement force;
- a fluid pump having a valve coupled to said fluid channel, said fluid pump introducing a quantity of fluid from said fluid pump through said fluid channel to said piston reservoir, wherein said quantity of fluid acts to push said piston head against said clutch spring, therein moving said translatable clutch housing from said disengaged position to said engaged position;
- wherein said main controller controls said quantity of fluid within said reservoir.

28. The engine cooling system of claim 27 further comprising one or more sensors electrically coupled to said main controller, said one or more sensors sending an electronic signal to said main controller as a function of an engine operating condition.

* * * * *